United States Patent [19]

Cub

[11] 4,065,341
[45] Dec. 27, 1977

[54] METHOD OF MAKING A LIQUID FILTER

[75] Inventor: Fritz Cub, Schwabach, Germany

[73] Assignee: Robert Bosch GmbH, Stuttgart, Germany

[21] Appl. No.: 413,634

[22] Filed: Nov. 7, 1973

[30] Foreign Application Priority Data

Nov. 21, 1972 Germany .............................. 2256995

[51] Int. Cl.² ............................................. B65H 81/00
[52] U.S. Cl. ...................................... 156/187; 55/498; 156/215; 156/294; 210/487
[58] Field of Search ................. 156/69, 187, 191, 210, 156/215, 218, 291, 293, 294, 309, 321; 210/493, 493 B, 494, 486, 487, 506; 55/498, 514, 520

[56] References Cited

U.S. PATENT DOCUMENTS

| | | | |
|---|---|---|---|
| 3,025,963 | 3/1962 | Bauer | 210/487 |
| 3,042,571 | 7/1962 | Jackson | 210/493 B |
| 3,189,179 | 6/1965 | McMichael | 210/493 |
| 3,392,843 | 7/1968 | Mumby | 210/493 |
| 3,520,417 | 7/1970 | Durr et al. | 210/493 |
| 3,563,828 | 2/1971 | Marshall | 156/321 |
| 3,692,184 | 9/1972 | Miller et al. | 55/498 |
| 3,722,696 | 3/1973 | Dwyer et al. | 210/494 |
| 3,738,813 | 6/1973 | Esmond | 210/494 |
| 3,739,916 | 6/1973 | Cub et al. | 210/493 |
| 3,799,354 | 3/1974 | Buckman et al. | 55/498 |

*Primary Examiner*—David A. Simmons
*Attorney, Agent, or Firm*—Edwin E. Greigg

[57] ABSTRACT

A method of making a liquid filter includes the steps of providing a spiral roll of filtering material on a central tubular member, providing a housing member into which the roll is to be placed and laying a bead of thermoplastic material having a given softening point on an outer surface of the roll at least around the circumference of the roll close to an end thereof. The bead is pressed with cooled forming jaws, while in a warm state, to suitable dimensions corresponding to inside dimensions of the housing member. The housing member is heated to a temperature above the softening point of the thermoplastic material, the roll is inserted into the housing member and thereafter, the housing member is cooled. The thermoplastic material cools, acts as a glue and constitutes a tight, rigid connection between the housing member and the roll of filtering material.

7 Claims, 1 Drawing Figure

METHOD OF MAKING A LIQUID FILTER

BACKGROUND OF THE INVENTION

This invention relates to a method of making a liquid filter which includes a roll of filtering material which is fastened in a housing part. The invention relates, more particularly, to a method of making a liquid filter which includes a roll of filtering material which is to be axially traversed by the liquid, which is itself made of a spiral of filtering material wound on a central tube, and which is fastened to a housing part.

In the construction of such filters it has been customary to glue together the outer end face of a spirally wound roll of paper filtering material, rolled up on a central tubular member, to the filtering roll itself. Subsequently, a broad bead of glue material was applied to the outer circumference of the roll, and the roll, prepared in this fashion, was introduced into a cylindrical housing. In practice, excess glue always remained hung up at the edge of the housing and had to be removed either by hand or by special machines. The solidified two-component glue formed a tight, rigid connection between the paper filtering material and the metal housing. This process is difficult to simplify and to automate.

It is further known to make a liquid filter by disposing a zigzag-shaped, folded filter paper web, bent into a ring, between a housing member and a central tube in such a manner that the folded edges of the web formed a bellows running in a star-shaped fashion from the central tube outwardly. The bellows is firstly tightly and rigidly sealed to the housing member, using a thermoplastic foil which lies in the housing member. Only subsequently is the butt of the still-open, central tube sealed. This known construction method uses thermoplastic material and is susceptible to considerable automation of its individual steps, but it can be used only for forming the above-mentioned filter ring roll, having a so-called axial, star-shaped construction. Because of the open tube, filter rolls of this nature can easily be inserted into a housing member.

OBJECT AND SUMMARY OF THE INVENTION

It is an object of the present invention to provide a method of making a liquid filter which is as simple as possible and consequently especially suitable for economical mass production.

It is another object of the present invention to provide a method of making a liquid filter which avoids the need to remove excess glue from an edge of the housing member during manufacture.

The foregoing objects, as well as other which are to become clear from the text below, are accomplished in a method of making a liquid filter having a filtering roll which is fastened to a housing part, is itself made of a spiral of filtering material wound on a central tubular member and is to be axially traversed by liquid to be filtered. The method involves the steps of providing a spiral roll of filtering material on a central tubular member, providing a housing member into which the roll is to be placed, laying a bead of thermoplastic material having a given softening point on an outer surface of the roll at least around the circumference of the roll in the vicinity of an end thereof, pressing with cooled forming jaws the bead, in a warm state, to suitable dimensions corresponding substantially to inside dimensions of the housing member, heating the housing member to a temperature above the given softening point of the thermoplastic material, inserting the roll into the housing member, and thereafter cooling the housing member to solidify the thermoplastic material. The liquid filter is formed upon the solidification of the thermoplastic material, which acts as a glue and constitutes a tight, rigid connection between the housing member and the roll of filtering material.

It is an important feature of the present invention that, prior to the insertion of the filter roll into the housing member, a bead of thermoplastic material, which is to act as a glue, is laid around the circumference of the filtering roll. The bead is pressed in the warm state to suitable dimensions corresponding to the inside dimensions of the housing member, by means of cooled forming jaws. Subsequently, the filter roll is inserted into the housing member, which has been heated to a temperature above the softening point of the thermoplastic material, and is thereafter cooled off. As a consequence of these steps, the soldifying thermoplastic material constitutes a tight, rigid connection between the housing member and the filtering roll.

This method has the advantage that the filter roll, because of the precision with which it has been formed, can be very simply inserted into the housing member. Because of the simplicity and precision, the method of the present invention can be easily automated. Further, no post-production or finishing steps, such as the removal of excess glue, are required.

It is particularly suitable when a hot-melting, thermoplastic material having a well-defined softening point is used in the process.

A particularly advantageous preferred adaptation of the method according to the invention provides that, substantially simultaneously with the application of an annular bead of thermoplastic material on the circumference of the filter roller, a second bead of thermoplastic material is laid along the cutting line of the spiral roll of filtering material. This second bead of thermoplastic material is also pressed, by cooled forming jaws, to a particular form, consistent with the shape and dimensions of the inside of the housing member.

The application of the thermoplastic material as described allows for the tight fastening of the filter roll within the housing member, for the fastening of the end of the spiral roll of filter material to the filter roll, and further for sealing of a spiral volume within the housing member in one single work step. After pressing into the proper form and dimensions, by use of cooled forming jaws, there is produced a dimensionally stable filter roll, which can either be immediately introduced into automatic machinery or stored for a period of time as long as desired.

Further particularly advantageous variants of the present invention are to become clear from the text description below. These include more particularized versions of the method which involve pressing the bead or beads into proper shape as well as into suitable dimensions and/or pressing the first bead so that its outside dimension is larger than the inside diameter of the housing member and/or pressing the second bead so that its outside dimension is smaller than the inside diameter of the housing member.

An exemplary embodiment of a liquid filter and the method of the invention are explained, with the aid of the accompanying drawing, which shows filter elements at several steps in the method according to the present invention in simplified form.

DESCRIPTION OF THE PREFERRED EMBODIMENTS

Figure 1:
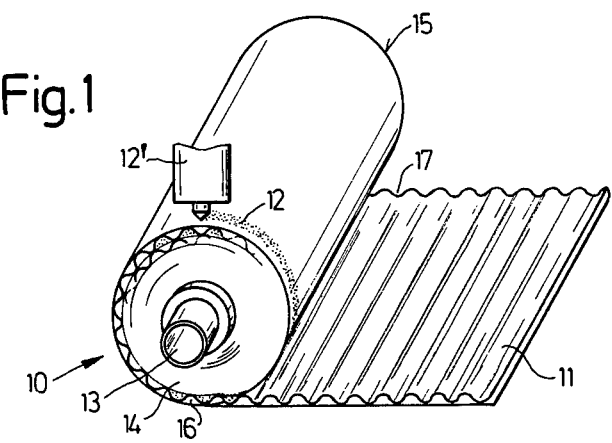
FIG. 1 is a perspective view of a filter roll during its formation step.
Figure 2:
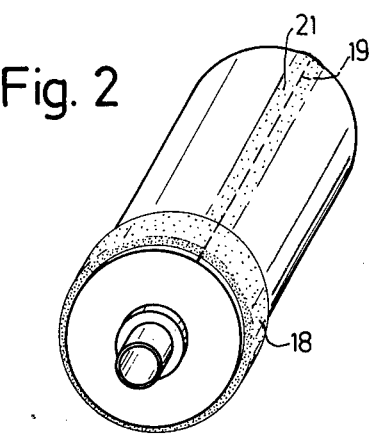
FIG. 2 is a perspective view of the filter roll, after completion of its formation step, cut to size and provided with first and second thermoplastic beads.
Figure 3:
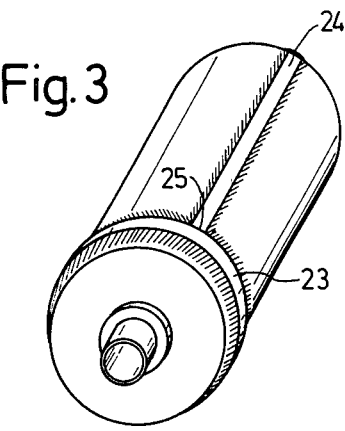
FIG. 3 is a perspective view of the filter roll of FIG. 2 with the first and second beads of thermoplastic material pressed into proper dimension and form.

FIG. 1 shows a filter roll 10 consisting of a rolled-up web 11 made of filtering material. The web 11 has a V-shaped cross section and is spirally wound about a central tubular member 13. A bead of thermoplastic material 12, dispensed by a nozzle 12', is placed on the outer surface of the rolled-up web 11 about its circumference in the vicinity of one end thereof. Two spiral-shaped open spaces 16, 17 are formed within the filter roll, which spaces are open, respectively, to respective end faces 14, 15 of the rolled-up web 11. Upon reaching a predetermined diameter, the filter roll 10, producible on a rolling machine, is cut to size and is fed into an automatic device (not shown). In this device, the filter roll 10, as shown in more detail in FIG. 2, is provided, in one single operation with a first bead 18 of thermoplastic material around its circumference in the vicinity of the end thereof defined by the face 14, and with a second bead 21 of thermoplastic material along an outer end 19 of the web 11. The application of the first bead 18 and the second bead 21 occurs substantially simultaneously.

The beads 18, 21 of thermoplastic material are made of a hot-melting meterial selected from a group of thermoplastic materials, which when heated, exhibit respective well-defined softening points. These materials, acting as glue, make possibe a tight and rigid connection between the paper of the filtering roll 10 and the metal of a housing member 22, shown in FIG. 4. The still warm beads 18, 21 of thermoplastic material are pressed to proper dimension and form, by cooled forming jaws, in which process smooth, annular surface 23 and smooth longitudinal surface 24 are formed on the top surface of the beads 18, 21. The outside diameter of the annular surface 23 is advantageously made somewhat larger than the associated inside diameter of the housing member 22. For reasons of assembly, it is advantageous to press the longitudinal surface 24 to an effective diameter which is somewhat smaller than that of the annular surface 23 so that at the transition of the two surfaces 24, 23 a small offset 25 is formed. The filter roll 10 is then complete, as such, is relatively stable in shape by virtue of the hot-meltng thermoplastic material forming the beads 18, 21 having solidified during cooling, and can therefore be immediately used further or else stored, depending on requirements.

Figure 4:
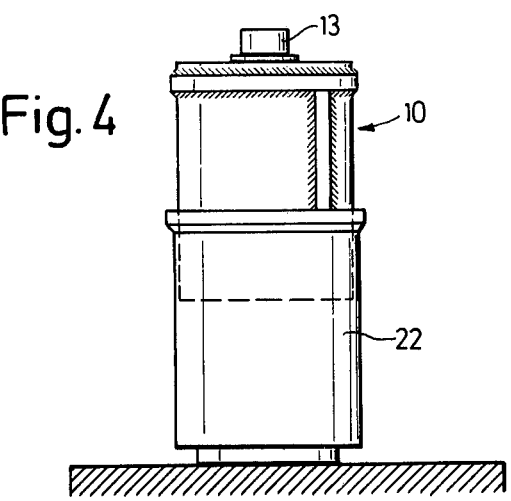
FIG. 4 is a front view of a liquid filter, showing the insertion of the filter roll into a heated housing member.

FIG. 4 shows the insertion of the completed filter roll 10 into the housing member 22, which is first heated to a temperature beyond the softening point of the hot-melting, thermoplastic material used, but only in the gluing zone. During the heating, the housing member 25 expands and thus facilitates the insertion of the filter roll 10. During the insertion, only the outer layers of the bead 18 are melted, thus the gluing characteristic of the hot melting thermoplastic material is activated to the extent required. Subsequent cooling solidifies the hot-melting, thermoplastic material and it forms a tight and rigid connection between the filter roll 10 and the housing member 22. During the cooling, the housing member 22 contracts again and therefore effects the achievement of a secure, reliable seal. A post-production finishing step or operation is not required; a lid (not shown) can be placed in the usual fashion on the housing member 22 and fixed and sealed thereto.

The process according to the invention is not limited to the filter construction shown. For example, the filter roll can have an oval cross section instead of the circular form. In addition, the filter roll, instead of fitting into a can-shaped housing member, can also be equipped with a flat lid and made, in the same way, into a filter element. Furthermore, the process can also be used in a filter roll whose filter material web, instead of being the web shown, with a V-shaped cross section, consists of two separate paper webs which are spirally wound in known fashion.

That which is claimed is:

1. A method of making a liquid filter having a filtering roll which is fastened to a housing part, is itself made of a spiral of filtering material wound on a central tubular member, and is to be axially traversed by a liquid to be filtered, the method comprising, in combination:
   a. providing a spiral roll of filtering material on a central tubular member,
   b. providing a housing member into which said roll is to be placed, said housing member defining an outer edge,
   c. laying a first bead of thermoplastic material having a given softening point on an outer surface of said roll at least around the circumference of said roll in the vicinity of an end thereof,
   d. pressing with cooled forming jaws said first bead in a warm state to an outside diameter larger than the inside diameter of said housing member,
   e. inserting the roll partly into the housing member so that the first bead engages the outer edge of the housing member,
   f. heating said housing member to raise its temperature above said given softening point of said thermoplastic material to soften said first bead on its circumference during further insertion of the roll into said housing member and, thereafter
   g. cooling said housing member to solidify said thermoplastic material;
   whereby a liquid filter is formed upon solidification of said thermoplastic material which acts as a glue and constitutes a tight, rigid connection between the housing member and the roll of filtering material.

2. A method as defined in claim 1, including providing a thermoplastic hot-melting material which has a well-defined softening point for use in step (c).

3. A method as defined in claim 1, further including laying a second bead of thermoplastic material along a cutting line of said roll of filtering material, and pressing with cooled forming jaws said second bead to be consistent with the inside of said housing member.

4. A method as defined in claim 3, wherein said first and said second beads of thermoplastic material are substantially simultaneously laid.

5. A method as defined in claim 3, wherein said second bead is pressed to size so that it provides an outside diameter for the thus modified spiral roll which is less than the associated inside diameter of said housing member.

6. A method as defined in claim 5, wherein said second bead is pressed to its proper dimension and simultaneously shaped into proper form.

7. A method as defined in claim 1, wherein said first bead is pressed to its proper dimension and simultaneously shaped into proper form.

* * * * *